United States Patent [19]

Sillerud et al.

[11] Patent Number: 4,803,054

[45] Date of Patent: Feb. 7, 1989

[54] ASYMMETRIC HEAT-EXCHANGE REACTION APPARATUS FOR EFFECTING CHEMICAL REACTIONS

[75] Inventors: Dean R. Sillerud, Englewood; Hermann W. Peterscheck, Longmont, both of Colo.

[73] Assignee: VerTech Treatment Systems, Inc., Denver, Colo.

[21] Appl. No.: 25,470

[22] Filed: Mar. 13, 1987

[51] Int. Cl.$^4$ .............................................. B01J 10/00
[52] U.S. Cl. .................................. 422/109; 210/129; 210/170; 210/175; 422/202
[58] Field of Search ............... 422/202, 205, 184, 109; 166/262; 210/747, 761, 762, 129, 170, 175

[56] References Cited

U.S. PATENT DOCUMENTS

| | | | |
|---|---|---|---|
| 3,449,247 | 6/1969 | Bauer | 210/761 |
| 3,606,999 | 9/1971 | Lawless | 210/761 |
| 3,853,759 | 12/1979 | Titmas | 166/256 |
| 4,098,589 | 7/1978 | Buswell et al. | 48/94 |
| 4,272,383 | 6/1981 | McGrew | 210/741 |

OTHER PUBLICATIONS

Rappe et al., Mile-deep Reactor Destroys Sludge with Ease, Waste/Engineering & Management, Sep. 1985.

Primary Examiner—Peter Kratz
Attorney, Agent, or Firm—Cullen, Sloman, Cantor, Grauer, Scott & Rutherford

[57] ABSTRACT

In accordance with the present invention there is provided a reaction apparatus having an externalized heat exchange mechanism by which heat may be added to or withdrawn from a reactant mixture. In one aspect, the present invention includes a cased well which extends approximately 5000 feet vertically into the earth in which at least one reaction vessel is suspended from a support plate at substantially ground level surface. The reaction vessel comprises an outer closed-end tube in which an inner open-end tube is disposed in a concentric manner to define an annulus which is in flow communication with the bore of the inner tube. Substantially parallel to the reaction vessel and also suspended from the ground level support plate, is a conduit which extends into the chamber defined by the well-casing. In the method of the present invention, a mixture of reactants, preferably diluted municipal waste, is injected into the annulus of the reaction vessel to form a hydrostatic column which exerts substantial fluid pressure at a reaction zone in the lower part of the reaction vessel. A heat-transfer medium, such as oil, is heated to an elevated temperature and then flowed through the conduit into the chamber where the hot heat-transfer medium envelopes the reaction vessel. Heat is transferred from the heat-transfer medium to the reactant mixture through the wall of the outer closed-end tube. In the case of an exothermic reaction, when the temperature of the reactants reaches a selected level, the reaction process gives off heat which is withdrawn by the heat exchange medium. As the reactants form reaction products, the reaction products are flowed from the annulus through the bore of the inner tube back up to ground surface level.

15 Claims, 7 Drawing Sheets

ASYMMETRIC HEAT-EXCHANGE REACTION APPARATUS FOR EFFECTING CHEMICAL REACTIONS

FIELD OF THE INVENTION

The present invention relates generally to methods and apparatus for initiating and controlling chemical reactions and, more specifically, to methods and apparatus which are particularly efficient for large-scale, aqueous-phase oxidation of municipal wastes.

BACKGROUND OF THE INVENTION

It is well known that chemical reactions which proceed slowly at low temperatures can be accelerated greatly by increasing the temperature of the reactants. Thus, many large-scale, high-temperature reactions are carried out daily in a variety of industrial applications. In many instances, it is necessary to conduct these high-temperature reactions at pressures substantially greater than atmospheric pressure. In the past this has been achieved primarily, through the use of massive, thick-walled, high pressure, above-ground reactors having complex mechanical stirring mechanisms. A reaction mixture typically is injected into such an above-ground reactor using a high-pressure pump and the reactants are then heated to bring about an accelerated chemical reaction. When the reaction is complete, the reaction products are removed from the reactor and the process is repeated. For the most part, these above-ground reactors are expensive to construct, maintain and operate.

As a desirable alternative to above-ground reactors, attempts have been made to design low-profile, subterranean or "down-hole" reaction apparatus. The concept of a below-ground reaction apparatus is, of course, appealing from the stand-point of land usage. Other significant advantages are, however, also attained by subsurface construction. In particular, a vertical, down-hole reaction apparatus can now be built which utilizes gravity and thermodynamics to provide a high-pressure reaction environment in which thermal energy is conserved. This remarkable downhole reaction apparatus is disclosed in U.S. Pat. No. 4,272,383 to J. L. McGrew which is assigned to the assignee of the present invention and the disclosure of which is incorporated herein by reference.

It has been found that the McGrew apparatus is especially effective in the destruction of municipal waste by aqueous-phase or "wet" oxidation. Aqueous-phase oxidation of combustible matter is an exothermic reaction which proceeds quite rapidly at temperatures above 350° F. The wet oxidation of municipal waste produces a low-volume, sterile ash, a liquid effluent and off-gases, portions of which may be reclaimed for industrial and agricultural use. Most importantly, wet oxidation in the McGrew apparatus efficiently and substantially reduces the oxygen demand of the waste which is of major concern in the discharge of treated wastes into receiving waters.

Generally, the McGrew down-hole, wet-oxidation reaction apparatus includes a vertical assembly of pipes or tubes which are suspended in a cased well. The pipes extend approximately 5000 feet below ground level and are arranged concentrically to define a series of annuli. The assembly has a central bore which serves as the downgoing passage of a heat exchanger. The first or innermost annulus is closed at its lower end in flow communication with the downgoing passage of the heat exchanger. This annulus functions as the upcoming passage of the central, concentric, heat exchanger. A heat-transfer medium such as oil is circulated through the heat exchanger by pumping it into the downgoing passage and then flowing it back up through the upcoming passage. The heat exchanger is significant not only because energy conservation is a matter of great importance, but also because it functions to regulate the temperature of the reactants. Thus, as will be explained more fully, the heat exchanger of a vertical, down-hole, wet-oxidation reaction apparatus is used to control the rate of reaction of the reactants by selectively supplying or removing heat.

In the McGrew apparatus, the tubes which define the downgoing passage and upcoming passage or annulus of the heat exchanger are positioned in the bore of a somewhat larger pipe or tube such that a second annulus is defined. This second annulus is the downgoing or influent passage for the reactants. However, the volume of the downgoing passage is significantly limited by the presence of the centrally disposed heat exchanger which must be large enough to achieve rate-controlling heat-transfer. A third annulus which is the upcoming or effluent passage is formed by an outer tube which surrounds the tube enclosing the second annulus. This outer tube is capped at its lower end such that the upcoming passage is in flow communication with the downgoing passage.

In operation, a reactant mixture is flowed into the downgoing reactant passage, which, as stated, is in heat exchange relation to the heat exchanger. In the case of municipal waste destruction, for which the McGrew apparatus is particularly well-suited, the reaction mixture includes diluted municipal waste having a chemical oxygen demand of from about 1.0 to 6.0 percent. As the diluted waste is pumped into the downgoing reaction passage, heat is supplied by the centrally disposed heat exchanger. This is achieved by pumping a heat-transfer medium through an above-ground heater and then through the flow pasasges of the heat exchanger, the annulus of which is adjacent the downgoing reactant passage. In addition to the diluted municipal waste, gaseous oxygen, alone, or present in a mixture of gases, is also injected through gas supply lines suspended in the downgoing reactant passage. The flow rate of the diluted municipal waste and the gaseous oxygen are regulated to provide a mixed flow velocity or flow pattern which promotes intense mixing to enhance mass transfer between the available oxygen and the combustible components of the municipal waste.

As the concentration of available oxygen and the temperature of the waste increase, the rate of the wet oxidation reaction increases. The exothermic oxidation reaction generates substantial heat which, in turn, further elevates the temperature of the reactants. When the temperature of the reactants exceeds about 350° F. to 400° F., the reaction becomes autogenous and it is no longer necessary to supply heat to the system. The fluid pressure exerted by the hydrostatic head of the approximately mile long column of diluted waste prevents the high temperature reaction mixture from boiling. In order to optimize the aqueous-phase oxidation reaction, the temperature of the reaction mixture is allowed to rise to about 500° F. to 550° F. in a reaction zone in the lower part of the down-going reactant passage where the reaction temperature is then maintained by removing heat with the heat exchanger. Thus, the heat exchanger provides heat to the reactants during start-up and helps regulate the reaction during continuous operation. Excess thermal energy produced by the reaction can be converted to electrical energy or the like simply by circulating the heat-transfer medium through, for example, a steam turbine.

The McGrew apparatus is preferably operated as a continuous-flow device. The diluted waste is substantially oxidized at elevated temperatures and pressures as it moves through the reaction zone. At the bottom of the reaction apparatus the reaction products or effluent are flowed into the upcoming passage to ground level and removed for further treatment or disposal.

Other, less efficient, down-hole reactors are known. For example in U.S. Pat. No. 3,449,247 to Bauer, a down-hole reaction apparatus is disclosed which does not include a centrally disposed heat exchanger. In the Bauer Patent no means is set forth or suggested by which the temperature of the reactants in the reaction zone can be controlled. In U.S. Pat. No. 3,606,999 to Lawless, disclosing another down-hole process, excess heat generated by exothermic reactions is removed and re-used with a complicated vapor collection procedure. It is also suggested by Lawless that the rate of reaction can be decreased by diluting the waste feed to lower the concentration of combustible matter. Finally, in the down-hole apparatus disclosed in U.S. Pat. No. 3,853,759 to Titmus, a steam line centrally disposed in the bore of the upcoming waste passage is used to heat the effluent which is in heat-transfer relation to the downgoing reactants. It is suggested that the reactant be re-circulated through the system during start-up to achieve operating temperatures. None of these other devices provide the advantages of the McGrew heat exchanger design.

The down-hole reaction apparatus initially proposed by McGrew provides a highly efficient device for the wet oxidation of municipal waste. An improved apparatus utilizing the principles of McGrew was successfully operated experimentally in Longmont, Colo., processing about 120 gallons of diluted waste per minute. It would be desirable to treat even larger volumes of waste using the principles of the McGrew device. However, in order to process larger amounts of waste with a single reaction apparatus, the waste flow passages must somehow be enlarged. This could be achieved in the McGrew-like apparatus by enlarging the internal diameters of the tubes which define the influent and effluent passages. Alternatively, or in addition to enlarging the foregoing tubes, the centrally disposed heat exchanger could be made smaller by decreasing the diameter of the tubes from which it is formed. Both of these alternatives, however, suffer from serious drawbacks.

Increasing the size of the reaction tubes is expensive and requires a correspondingly larger cased well. Since the cost of materials used to form the reaction tubes varies widely depending on availability and composition, increases in tube size may be quite cost intensive. While decreasing the size of the centrally disposed heat exchanger creates more space for the reactants, it also significantly limits the heat exchange capacity of the heat exchanger due to a reduction in both volume and surface area. In order to increase the volume of waste which could be contained in the reaction apparatus in such a manner that the reaction temperature could still be regulated by the centrally disposed heat exchanger, all of the tubes or "stringers", including those comprising the heat exchanger, had to be enlarged. Therefore, it would be highly desirable to provide a vertical, down-hole reaction apparatus which can process a large volume of reactants and by which precise control of reaction temperature can be attained. The present invention provides such an apparatus and a method of operating the novel apparatus which is especially suitable for the large-scale destruction of municipal waste.

SUMMARY OF THE INVENTION

In accordance with the present invention, there is provided a vertical, down-hole reaction apparatus which includes a large, verticallyoriented, subsurface chamber defined by the casing of a subterranean shaft or well which extends approximately 3000 to 6000 feet into the earth for subcritical operation. A longer reaction system may be preferred for supercritical reaction systems. Suspended in this chamber and spaced apart from the casing is a tubular reaction vessel having a closed-end, wastecontainment tube in which a waste pipe is centrally disposed. The containment tube and waste pipe are concentrically arranged to form an external passage or annulus defined by the inner wall of the containment tube and the outer wall of the waste pipe. The bore or internal passage of the waste pipe and the external passage are in flow communication at the lower end of the reaction vessel in the fashion of an hydraulic U-tube.

Gas supply lines extend downwardly into the reaction vessel passages. The terminal ends of the gas supply lines may be placed at various depths within the reaction vessel passages. For example, it may be desirable to place the terminal ends such that the introduction of gas, perhaps oxygen, is provided at or above the reaction zone in the reaction vessel, the location of which will be explained more fully. It may also be suitable in some applications to stagger the terminal ends of the gas supply lines so that gas is delivered at multiple depths in the reaction vessel, providing greater control of the reaction. Also suspended in the chamber is a conduit which is substantially parallel to, but spaced apart from the reaction vessel. That is, the conduit is externalized relative to the reaction vessel. Through this conduit, a heat-transfer medium is preferably flowed into the chamber which may be referred to as the heat-transfer media chamber. Other ports, inlets or the like may be provided to transport heat exchange medium between the ground level and the heat-transfer media chamber.

By "externalizing" the heat exchanger, the volume of the reaction vessel is substantially increased without increasing the diameter of the reaction apparatus tubes or "stringers". Further, as will be explained more fully, greater control over the temperature of the reactants is obtained and fouling of the reaction apparatus is reduced. This novel construction also facilitates placement of monitoring instruments such temperature and pressure sensors, leading to improved instrumentation capabilities. Importantly, this externalized heat exchanger configuration compliments a multiple reaction vessel design wherein multiple reaction vessels are suspended in a single heat-transfer media chamber, which is a preferred embodiment of the present invention.

The method of the present invention provides a process for the treatment of a diluted municipal or other waste by aqueous-phase oxidation using the novel reaction apparatus of the present invention. In substance, a diluted stream of municipal waste is flowed into the reaction vessel of the inventive reaction apparatus while gaseous oxygen is supplied thereto through the gas supply lines. To optimize heat-transfer during start-up, the fluid waste stream is preferably introduced into the annulus of the reaction vessel. It will be understood that the waste containment tube is directly surrounded by the heat-transfer media chamber. Hot heat-transfer medium is pumped down through the heat-transfer media conduit into the heat-transfer media chamber. In a preferred embodiment, the conduit is insulated to conserve heat as the heat-transfer medium flows downwardly. As the level of hot, heat-transfer medium rises around the reaction vessel, diluted waste in the reaction vessel annulus acquires heat which is conducted through the containment tube wall. Heat-transfer medium is preferably continuously circulated through the heat-transfer media chamber which, as stated, is in heat exchange relation to the containment tube and its contents. Hence, the present invention provides an externalized heat-exchanger for the control of the reaction and for heat recovery.

As the temperature of the aqueous mixture of waste and gaseous oxygen reaches approximately 350° F., an accelerated aqueous-phase oxidation reaction is brought about. Heat generated by the exothermic reaction is transferred to the reactants and the temperature of the reactants is allowed to rise to about 500° F. to 550° F. at a reaction zone in the lower part of the reaction vessel. In the reaction zone, boiling is prevented by the substantial fluid pressure exerted by the hydrostatic head of the nearly mile-high column of diluted waste. At about 550° F. the wet oxidation reaction is generally quite vigorous, generating large amounts of excess heat. This excess heat is then recovered by circulating cool heat-transfer medium through the heat-transfer media chamber whereby reaction heat is transferred from the reaction vessel to the medium. By controlling the flow rate and temperature of the heat-transfer medium, the temperature of the reactants can be regulated precisely. The reaction products are then flowed up through the effluent passage, which, as described, is preferably the bore of the waste pipe. As stated, the annulus and bore of the reaction vessel are in flow communication.

Alternatively, by sufficiently increasing the operating pressure of the reaction vessel either through increasing the depth of the reaction zone or by increasing the back pressure of upcoming passage, the temperature of the reactants can be increased to provide supercritical conditions.

Thus, in addition to providing substantial cost reductions in the construction and maintenance of the reaction apparatus, the externalized heat-exchanger configuration of the present invention enhances heat control of the reaction and provides greater thermal energy recovery due to the increased surface area for heat transfer between the heat-exchanger and the reaction vessel.

In another aspect, the reaction apparatus of the present invention includes a reaction vessel and an externalized heat exchanger wherein the reaction vessel is an assembly of three concentric tubes which reduces the amount of heat-transfer medium required for operation. This three-tube reaction vessel also significantly reduces heat-loss to the primary well-casing and thus to the surrounding rock. In substance the closed-end waste containment tube and its centrally disposed waste pipe are positioned in the bore of a third tube which functions as a heat exchange jacket, defining a heat-transfer media annulus. The heat exchange jacket is open at its lower end in flow communication with the heat-transfer media chamber. Pack-off assemblies are disposed annularly around the heat exchange jacket in sealing contact with the casing of the well. The pack-off assemblies may also be placed around the heat-transfer media conduit, likewise in sealing contact with the primary well-casing. The pack-off assemblies are arranged such that heat-transfer medium flowed downwardly through the heat-transfer media conduit enters only a small portion of the heat-transfer media chamber, that portion being the very bottom of the chamber. The rest of the chamber is partitioned off by the pack-off assemblies. The flow of heat-transfer medium is thus directed into the heat exchange annulus in contact with the containment tube where it is confined by the heat exchange jacket. To achieve even greater conservation of thermal energy, the remaining portion of the heat-transfer media chamber, which does not contain heat exchange medium, may be filled with a thermally insulating gas or liquid.

In still another aspect, the reaction apparatus of the present invention is configured such that it includes a first insulated tubular which supplies heat transfer medium to the heat-transfer media chamber and a second insulated tubular in flow communication with the heat-transfer media chamber such that in operation the hot heat exchange medium can be withdrawn. This arrangement minimizes heat loss by the heat transfer medium. Insulated tubulars serve as heat-transfer media conduits in this configuration and are linked by horizontal sections to the heat-transfer media chamber.

The present invention also provides a reaction apparatus having externalized heat-exchangers in the manner described wherein the reaction vessel and heat-transfer media conduits are suspended within casings that are rigidly secured in place with grout or the like in the well hole. This allows for the convenient removal of the reaction vessel strings and the heat-transfer media conduits for repair, cleaning or the like. Alternatively, a reaction apparatus is provided in which one or more of the heat-transfer media conduits are grouted in place in the well hole.

These and other meritorious features and advantages of the present invention are disclosed more fully in the following description of the preferred embodiments with reference to the attached drawings and in the claims appended hereto.

DESCRIPTION OF THE PREFERRED EMBODIMENTS

Figure 1:
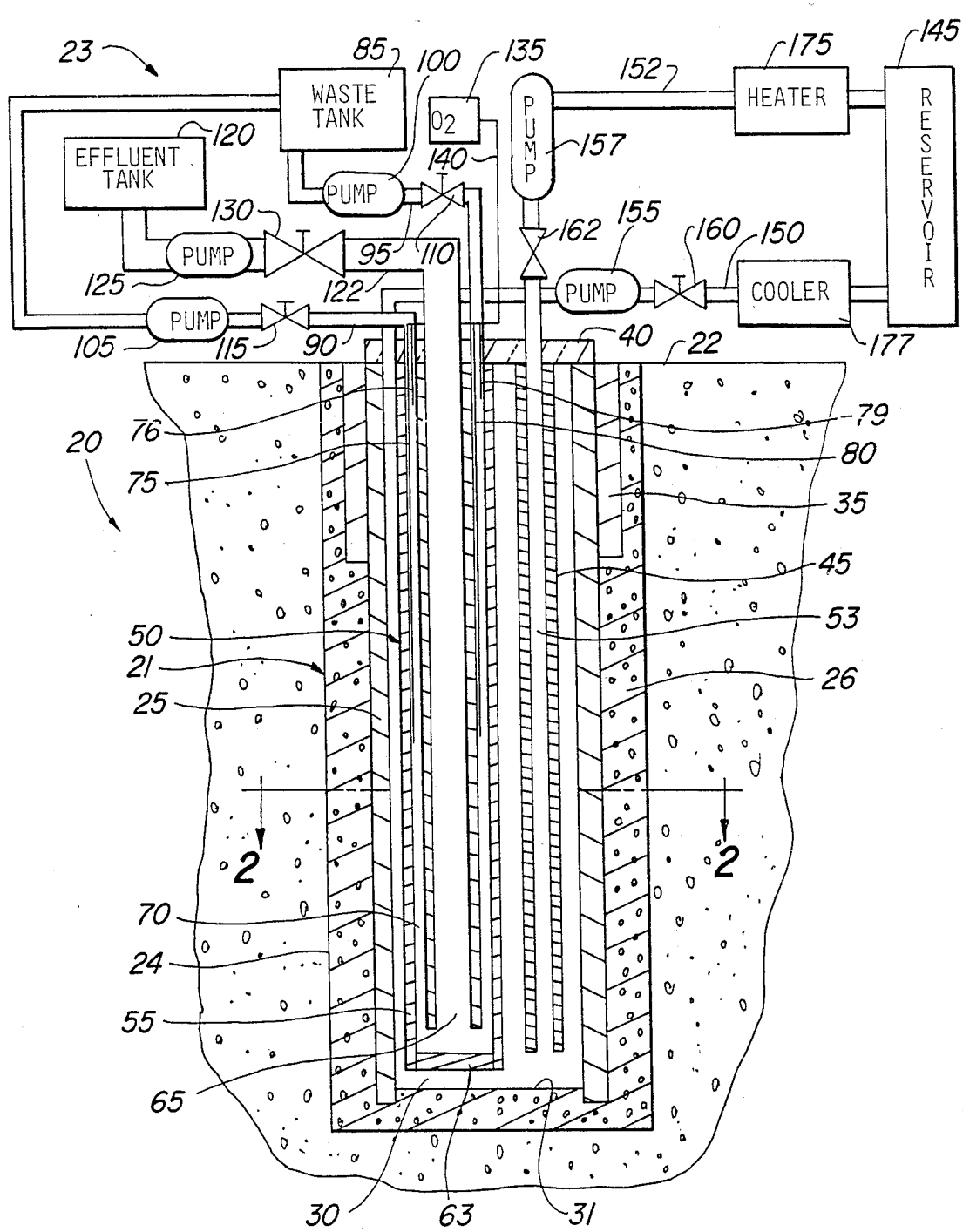
FIG. 1 is a vertical cross-sectional view of the subsurface portion of the present invention with the above ground portion shown schematically.

Referring now to FIG. 1 of the drawings, and in accordance with the present invention, reaction apparatus 20 is seen generally having subsurface portion 21 shown in vertical cross-section extending vertically below ground surface level 22. Above-ground portion 23 is shown schematically for simplicity. Subsurface portion 21 of reaction apparatus 20 is assembled in a subterranean shaft or well 24 which preferably extends at least approximately 5000 feet below ground surface level 22. Subterranean shaft or well 24 is a conventional cylindrical well-hole drilled in the known matter.

The walls of well 24 are lined or cased with primary well casing 25 which is secured to the walls of the well hole with a layer of grout 26. Grout 26 may include a thermal stabilizing agent since it is subjected to elevated temperatures during operation. Primary casing 25 forms a vertical, elongated encasement and defines heat-transfer media chamber 30 which in this embodiment is in the nature of a cylinder. Bottom or floor 31 of chamber 30 may simply comprise a grout plug or the like. It is to be understood that while primary casing 25 and chamber 30 which it defines as well as other structures of the present invention are shown having a cylindrical construction, it may be possible to utilize non-cylindrical structures if the principles of the present invention are faithfully observed.

Primary casing 25 serves to confine a heat-transfer medium during operation. It should be formed of a material which is relatively non-porous and in a manner such that no cracks or voids are present which would allow the heat-transfer medium to flow into surrounding rock formations. Suitable materials include alloyed steels. Carbon steels are preferred. Secondary casing 35 is also provided which extends only partially into the well hole adjacent primary casing 25. The upper end of primary casing 25 is secured in place with base support plate 40, preferably formed of metal, positioned at ground level to which primary casing 25 is preferably welded. In order to achieve an even lower profile for above ground portion 23, metal base plate 40 may be recessed below ground surface level 22.

Figure 2:
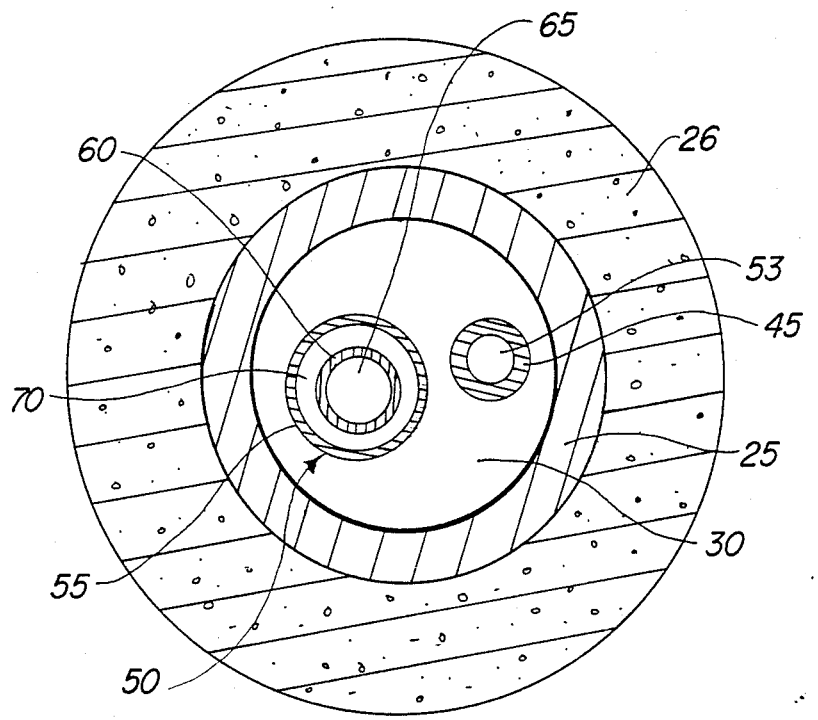
FIG. 2 is a cross-sectional view taken along lines 2—2 of FIG. 1.

Suspended in chamber 30 and also attached to base plate 40 are pipe or conduit 45 and reaction vessel 50. Conduit 45 defines channel 53 through which a heat-transfer medium is flowed during operation. In order to maximize conservation of thermal energy, conduit 45 is preferably a thermally insulating tube or insulated tubular. Both conduit 45 and reaction vessel 50 are spaced apart from primary casing 25 as best shown in FIG. 2 which is a sectional view taken along lines 2-2 of FIG. 1. Conduit 45 and reaction vessel 50 are also spaced above floor 31 to permit the unobstructed flow of heat-transfer medium.

Referring now to FIGS. 1 and 2, reaction vessel 50 includes waste containment pipe or tube 55 having waste pipe 60 suspended therein. Waste containment tube 55 and waste pipe 60 are arranged in a concentric or tube-within-a-tube relationship and are welded at one end or otherwise attached to base plate 40. It may be suitable in some applications to provide an intermediate connector (not shown) between base plate 40 and the tubes suspended therefrom to allow for the removal of the reaction tubes for maintenance purposes. In any event, the reaction tubes are most preferably connected to base plate 40 in such a manner as to allow for expansion and contraction of the tubes during changes in temperature which are encountered during operation of reaction apparatus 20. Bottom 63 of waste containment tube 55 is closed with an end cap or the like. The lower end of waste pipe 60 is open such that waste channel 65 which it defines is in flow communication with waste annulus 70. Waste channel 65 and waste annulus 70 are in heat exchange relation to one another. It will be apparent that waste annulus 70 lies between the outer surface of waste pipe 60 and the inner surface of waste containment tube 55. It is in reaction vessel 50 that the desired chemical reaction is brought about. As will be explained in the method of the present invention a gaseous reactant is injected into reaction vessel 50 through oxygen supply lines 75, 76, 79 and 80, shown extending into waste annulus 70 at multiple depths.

The pipes or tubes which make up reaction vessel 50 and heat exchange media conduit 45 are formed from a plurality of end to end pipe sections connected at adjacent ends using standard well-type pipe connections. Waste containment tube 55 is preferably formed from a corrosion resistant material such as stainless steel or a titanium alloy.

Above ground portion 23 includes those devices which are used to operate reaction apparatus 20, including pumps, valves, storage and mixing tanks, heat exchange devices and the like. Specifically, and with reference to FIG. 1, above ground portion 24 includes waste supply tank 85 in which diluted municipal wastes or other reactants are prepared to be introduced preferably into waste annulus 70 of reaction vessel 50 through waste flow lines 90 and 95. Waste pumps 100 and 105 facilitate the flow of waste into waste annulus 70. Waste flow is regulated with valves 110 and 115 in waste flow lines 90 and 95. Effluent tank 120 is also provided in flow communication with waste channel 65 via effluent flow line 122 which includes effluent pump 125 and valve 130. Oxygen source 135 is seen having common oxygen supply line 140 connecting supply lines 75, 76, 79 and 80. Oxygen source 135 may include oxygen tanks, compressors, pumps and the like.

In order to supply and circulate heat-transfer medium such as oil through channel 53 and chamber 30, reservoir 145 with its associated flow lines 150 and 152 are provided. Heat-transfer medium is stored in reservoir 145. Each flow line 150 and 152 includes, respectively, pumps 155 and 157 and valves 160 and 162 by which the flow of heat exchange medium is regulated. Positioned in flow line 152 is heater 175 by which heat is supplied to the heat-transfer medium during operation. Heat may be removed from the heat-transfer medium with cooler 177 in flow 150. As stated, upper portion 24 of reaction apparatus 20 is shown diagrammatically for simplicity and further particulars of a system of this general type are provided in the foregoing McGrew patent. For example, upper portion 23 may include ash settling tanks, by-pass lines, back-pressure control valves, low pressure pumps, pressure control valves, and the like.

Figure 3:
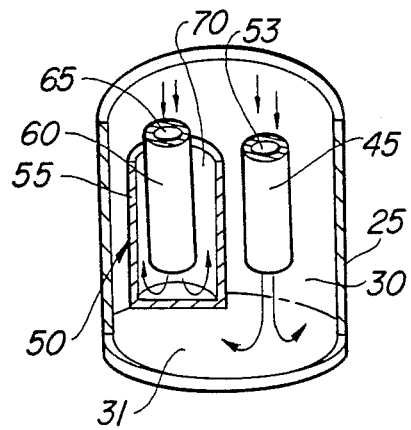
FIG. 3 is a cross-sectional perspective view of the lower portion of the reaction apparatus.

Referring now to FIG. 3 of the drawings, the end portion of subsurface portion 21 of reaction apparatus 20 is shown to better illustrate the relationship of reaction vessel 50 and conduit 45 relative to floor 31 with arrows indicating preferred flow directions. As clearly shown, chamber 30 and channel 53 are in flow communication as are waste channel 65 and waste annulus 70. Waste annulus 70 is in heat-transfer relation to chamber 30 and to waste channel 65.

Figure 4:
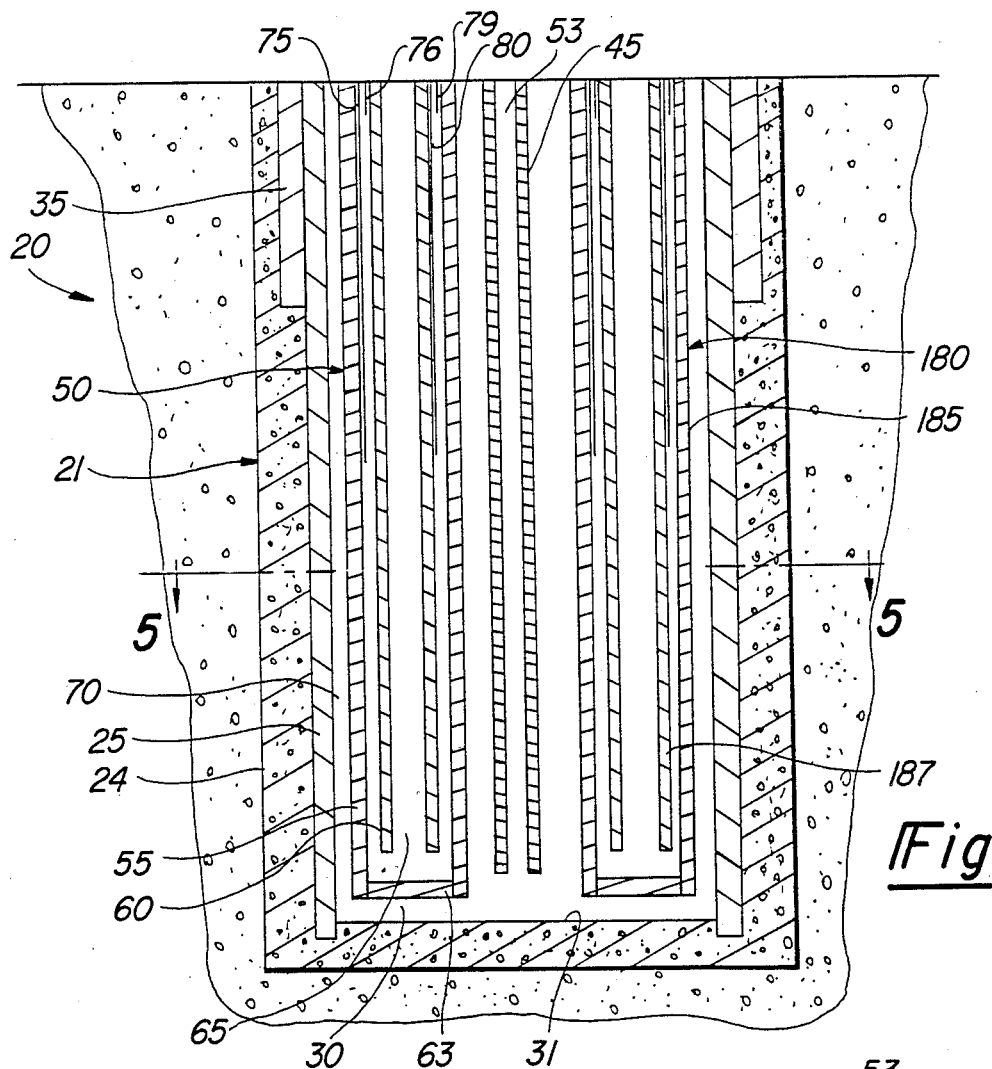
FIG. 4 is a vertical cross-sectional view of a modification of the present invention in which multiple reaction vessels are suspended in a single well.
Figure 5:
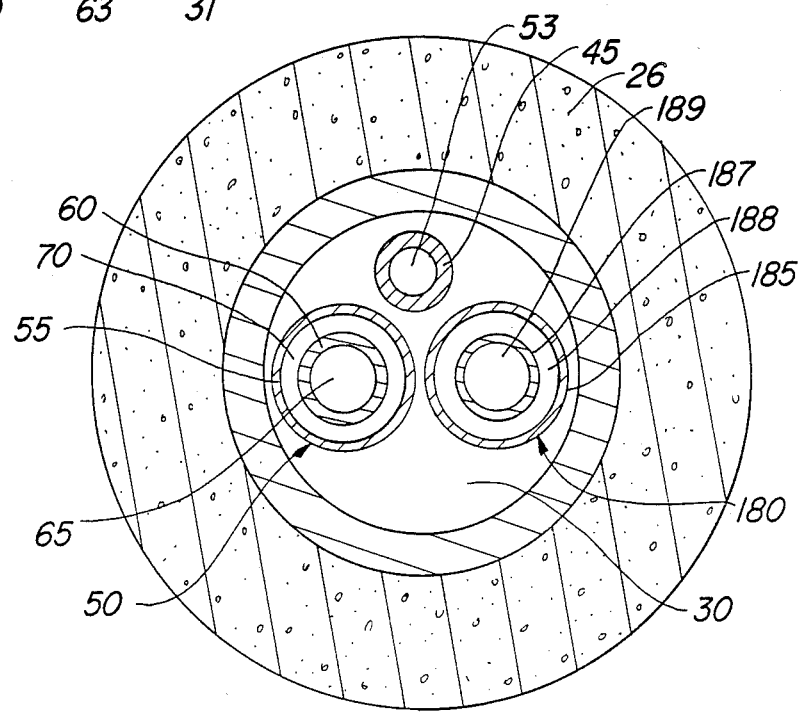
FIG. 5 is a cross-sectional view taken along lines 5—5 of FIG. 4.

In FIGS. 4 and 5 the present invention is shown in another aspect in which an additional reaction vessel 180 is positioned in chamber 30 along side reaction vessel 50. Reaction vessel 180 includes waste containment tube 185 and waste pipe 187 arranged concentrically in the fashion of waste containment tube 55 and waste pipe 60 to form waste annulus 188 and waste channel 189. By placing two reaction vessels, 50 and 180, in a single chamber 30, the volume of reactants which can be reacted is doubled. In some applications, it may be desirable to pump the effluent from reaction vessel 50 into reaction vessel 180 in order to carry out a more complete reaction. It may also be suitable to react one set of reactants in reaction vessel 50 while simultaneously reacted a different set of reactants in reaction vessel 180 with both reactions being controlled with a heat-transfer medium in chamber 30. If chamber 30 is made sufficiently large, an even greater number of reaction vessels could be employed in a single reaction apparatus 20. With multiple reaction vessels, it may be desirable in some instances to provide more than one conduit 45 for the flow of heat-transfer medium.

By externalizing the heat exchange components of reaction apparatus 20 relative to reaction vessel 50, several important advantages are achieved by the present invention. Primarily, the volume of waste which can be processed in reaction vessel 50 is increased substantially since the space previously occupied by the central heat exchanger is now available to be occupied by waste. By adjusting the relative diameters of waste containment tube 55 and waste pipe 60 this newly available space can be equally portioned between waste channel 65 and waste annulus 70. Also, by providing a common chamber 30 for receiving a heat exchange medium, multiple reaction vessels 50 can be suspended in chamber 30 and controlled with a single heat exchanger as depicted in FIGS. 4 and 5. Importantly, the present invention allows the capacity of reaction vessel 50 to be increased simply by increasing the diameters of waste containment tube 55 and waste pipe 60 without increasing any other stringers as previously required. Since reaction vessel 50 now contains only a single annulus, annulus fouling by the accumulation of organic matter in the multiple annular spaces present in a reaction apparatus having a centrally disposed heat exchanger is reduced. The placement of instruments for determining pressure and temperature in reaction apparatus 20 is also facilitated by the present invention.

It will be understood that the externalization of the heat-exchanger substantially increases the surface area of the heat-exchange interface of the heat-exchanger and the reaction vessel which is an important feature of the present invention. This substantial increase in surface area of the heat-exchanger at its interface with the reaction vessel provides better utilization of start-up energy, enhances temperature mediated control of the reaction and maximizes the efficiency of thermal energy recovery procedures using the heat-exchanger.

Furthermore, the wet-oxidation processing of many municipal wastes exposes the walls of the reaction vessel to materials having high-chloride contents. For example, the wet oxidation of manure, which has a high concentration of chlorides, requires the use of chloride resistant materials to form the reaction vessel such that the metal surfaces in contact with the waste do not corrode easily. Expensive, high-grade, nickel or titanium alloys may at times be used to form the reaction vessel strings. The configuration of the present invention, wherein the heat-exchanger is externalized relative to the reaction vessel, significantly reduces the quantity of high-grade nickle or titanium alloy needed to construct the reaction vessel, yet maintains the conventional throughput capacity of the reaction apparatus. In some embodiments of the present invention, at current prices of high-grade nickle and titanium alloys, it may be possible to reduce the cost of the reaction vessel by as much as fifty percent. Of course, less expensive materials may be suitable for forming the tubes of the reaction vessel in many applications. In addition, the present invention reduces drilling costs since a smaller hole may be bored to accommodate a reaction vessel of equivalent volume.

In the method of the present invention, reaction apparatus 20 is preferably used for the aqueous phase oxidation of a dilute municipal waste. Referring now to FIG. 1, a municipal waste containing combustible organic matter is diluted with water in waste supply tank 85 to a solids concentration of about 5 percent by weight and a chemical oxygen demand of from about 1 percent to 5 percent. The diluted municipal waste is then pumped through waste flow lines 90 and 95 by pumps 100 and 105 to substantially fill waste annulus 70 of reaction vessel 50. This forms an annular, hydrostatic column which exerts substantial pressure at the bottom of waste containment tube 55. As the diluted municipal waste flows into waste annulus 70 gaseous oxygen which may be in a mixture of other gases is injected into the waste from oxygen source 135 into common oxygen supply line 140 and through oxygen supply lines 75, 76, 79 and 80. The injection of gaseous oxygen is controlled such that intense mixing and contacting between the gaseous oxygen and the organic waste is brought about to optimize mass transfer of the reactants. It may be desirable in some applications to add heat to the diluted waste as it is pumped into waste annulus 70 using an above ground heater (not shown). Following the formation of the hydrostatic diluted waste column in waste annulus 70, a heat-transfer medium such as oil is flowed into heater 175 from reservoir 145. The heat-transfer medium is heated to an elevated temperature with heater 175 and then pumped through flow line 152 into channel 53 of conduit 45. The heat-transfer medium flows through channel 53 into chamber 30. In some instances it may be advantageous to begin the flow of heat-transfer medium through chamber 30 during formation of the hydrostatic waste column. By using an insulated pipe or tube for conduit 45, heat loss through the conduit walls is substantially reduced. The hot heat-transfer medium pours into the bottom of chamber 30 and, as the flow continues, the level of heat-transfer medium rises, enveloping waste containment tube 55. By initially flowing the diluted waste into waste annulus 70 rather than waste channel 65 the diluted waste is placed in better heat-transfer relation with the heat-transfer medium. As the level of heat-transfer medium rises in chamber 30 it gives up heat to reaction vessel 50 and to the diluted waste contained therein. As the temperature of the diluted waste reaches approximately 300° to 350° F., the combustible matter in the waste and the gaseous oxygen react vigorously in a wet-oxidation reaction. In the lower portion of waste containment tube 55, the combination of heat supplied by the heat-transfer medium and heat generated during the exothermic aqueous-phase wet oxidation reaction is at its greatest. This area is generally defined as the reaction zone. Boiling is prevented by the intense fluid pressure of the hydrostatic fluid column in the reaction zone. At a temperature of about 550° F., the diluted waste is oxidized rapidly and the reaction temperature is sufficiently high such that excess heat can be withdrawn. This can be achieved by pumping the heattransfer medium out of chamber 30 through flow line 150 using pump 155 and regulating the flow with valve 160. Heat is extracted from the heat exchange medium by cooler 177. The thermal energy obtained thereby can be used for a variety of purposes, including the generation of electricity such as with a steam turbine.

The reaction products are flowed out of the reaction zone of waste annulus 70 and are forced upwardly through waste channel 65 of waste pipe 60. The flow of materials through reaction vessel 50 is preferably continuous. The hot waste product or effluent gives off heat through waste pipe 60 to the diluted municipal waste flowing downwardly through waste annulus 70. The effluent is flowed through flow line 122 by pump 125, the flow rate being regulated by valve 130. The effluent is pumped into effluent tank 120 which as stated may include separation devices for separating the low-volume sterile ash, the liquid effluent portion and the off gases which are produced during the wet oxidation reaction. These reaction products contain many useful by-products and may receive further waste treatment.

Although the preferred method of the present invention includes introducing the diluted waste into waste annulus 70 during start-up in order to maximize the transfer of heat from the heat-transfer medium to the diluted waste, it may be suitable and desirable in some applications to reverse the flow of dilute waste through reaction vessel 50 by introducing the diluted waste into waste channel 65 of waste pipe 60 during start-up. It is also to be understood that the flow of heat-transfer medium can be reversed such that it is withdrawn from chamber 30 through conduit 45.

Figure 6:
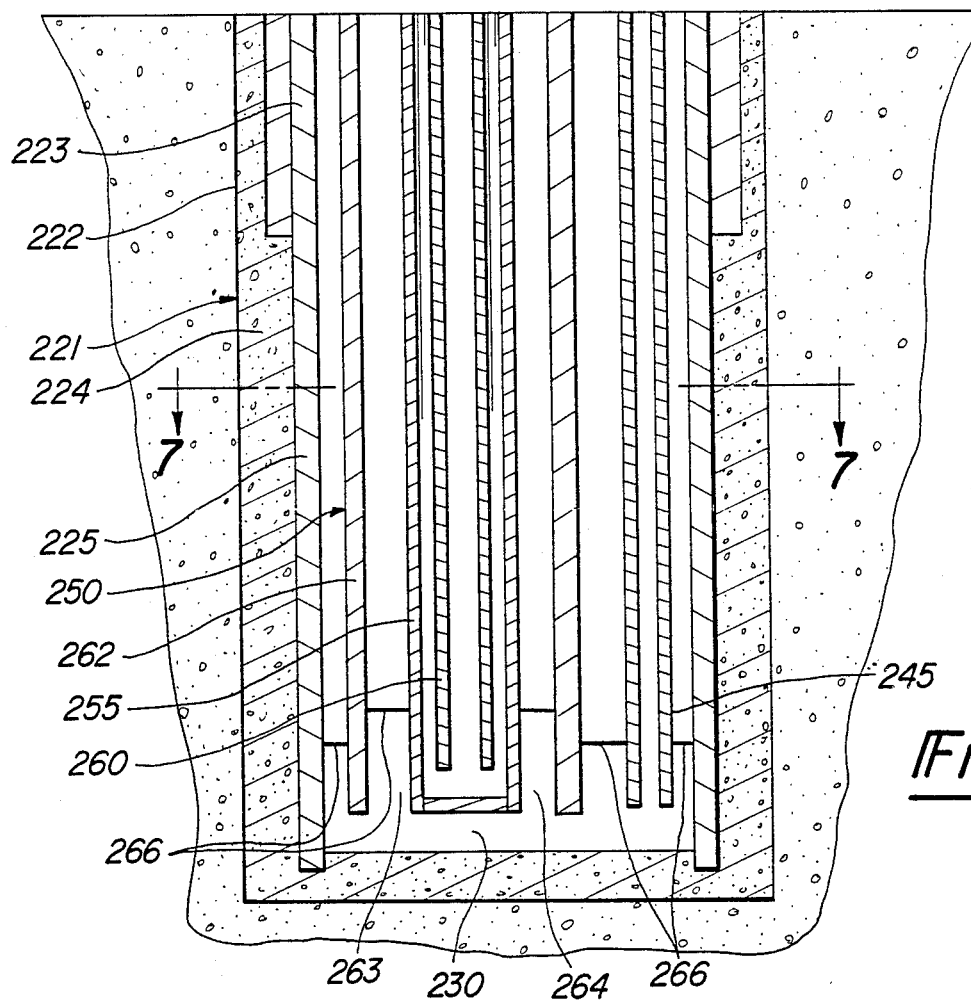
FIG. 6 is a vertical cross-section of the subsurface portion of another arrangement of the present invention.
Figure 7:
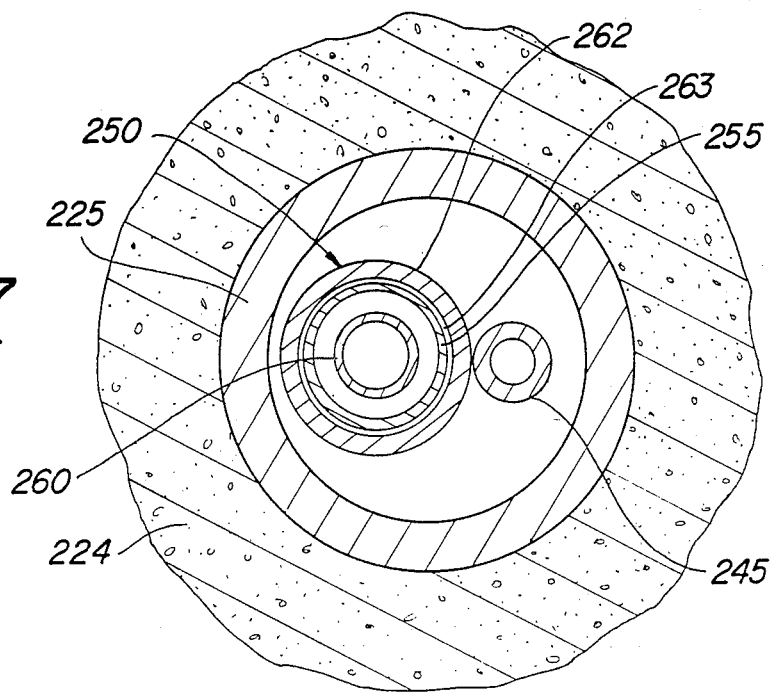
FIG. 7 is a cross-sectional view taken along lines 7—7 of FIG. 6.

In another embodiment of the present invention, and referring now to FIG. 6 of the drawings, subsurface portion 221 is shown including well 222, secondary casing 223 and grout 224. Primary casing 225 defines heat exchange media chamber 230 in which heat-transfer media conduit 245 is suspended in the manner previously described. In this embodiment, reaction vessel 250 includes waste containment tube 255 and centrally disposed inner tube or waste pipe 260, arranged generally concentrically as in the previous embodiment. However, in order to minimize the amount of heat-transfer media needed to operate the reaction apparatus, a third tube or outer tube or pipe portion referred to as heat exchange jacket 262 is provided which surrounds but is spaced apart from intermediate or waste containment tube 255 in a generally concentric manner. Heat exchange jacket 262 defines heat exchange annulus 263 which is in flow communication with chamber 230 through end 264 of heat exchange jacket 262 which is open. In FIG. 7, the concentricity of reaction vessel 250 is clearly illustrated. The method of operation of this embodiment is the same as that for the two tube reaction vessel 50 except that the level of heat-transfer medium 266 is kept at the lower portion of chamber 230 by pressurizing the upper portion of chamber 230 with an inert gas such as nitrogen or with air. The heat-transfer medium 266 thus flows upwardly through heat-transfer annulus 263 where it is in heat-transfer relation to waste annulus 270. In this embodiment of the present invention not only is a smaller quantity of heat-transfer medium needed, heat loss through primary casing 225 to the surrounding rock formations is substantially reduced.

Figure 8:
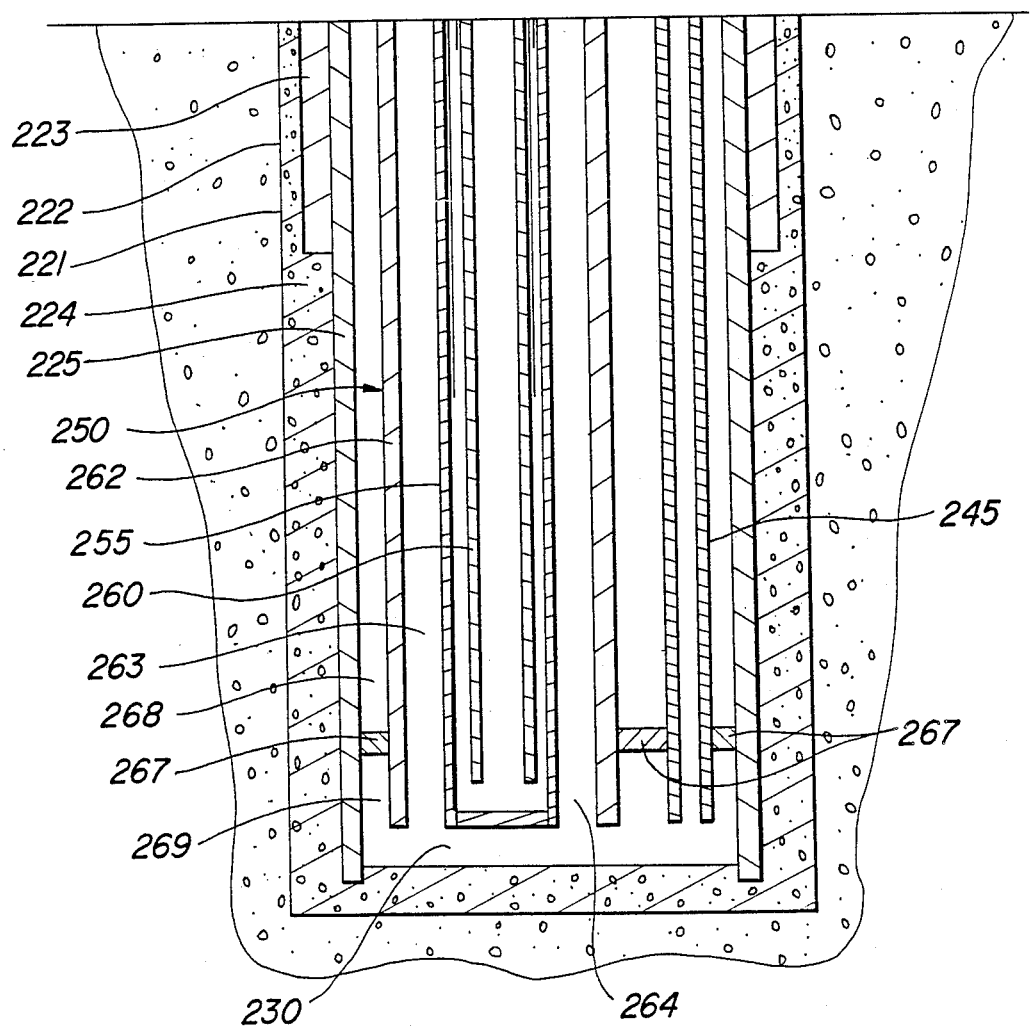
FIG. 8 is a vertical cross-section of the subsurface portion of another arrangement of the present invention.

In still another embodiment as shown in FIG. 8, pack-off assemblies 267 are placed around heat exchange jacket 262 to form a seal with primary casing 225. Similarly, pack-off assemblies 267 surround conduit 245 likewise forming a seal with primary casing 225. Pack-off assemblies 267 serve to partition chamber 30 into an upper portion 268 and a lower portion 269. In operation, the heat-transfer medium is flowed into lower portion 269 of chamber 230 through heat exchange media conduit 245 and, being blocked by pack-off assembly 267, is then forced upwardly through heat exchange annulus 263. Upper portion 268 of chamber 230 can be filled with insulating material (not shown) to better conserve thermal energy. Pack-off assemblies 267 should be formed of a material which can be formed into the desired shape and which is non-porous with respect to the particular heat-transfer medium which is employed.

Figure 9:
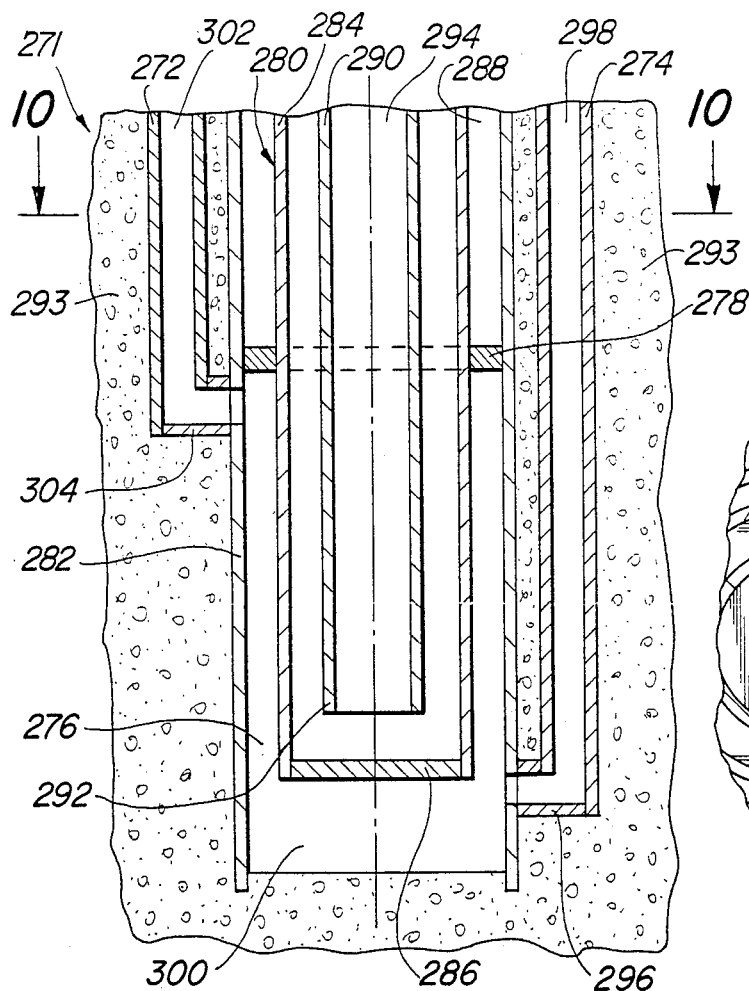
FIG. 9 is a vertical cross-section of the subsurface portion of still another arrangement of the present invention.

Referring now to FIG. 9 of the drawings, in still another embodiment of the present invention, first and second heat-transfer media conduits 272 and 274, respectively, are provided whereby hot heat exchange or heat transfer medium can be flowed into partitioned heat-transfer media chamber 276. Pack-off assembly 278 partially defines partitioned heat-transfer media chamber 276 and may comprise a radially extending pack-off member as shown in FIG. 9. Reaction vessel 280 is seen suspended within the chamber defined by well casing 282 which includes partitioned heat-transfer media chambers 276. Again, reaction vessel 280 includes waste containment pipe or tube 284 having closed end 286 such that reactants may be confined therein. Centrally disposed in the bore of waste containment pipe 284 and spaced apart therefrom to define annulus 288 is waste pipe 290. End 292 of waste pipe 290 is open so that flow communication is established between annulus 288 and bore or waste channel 294.

Referring now to heat-transfer media conduits 272 and 274, conduits 272 and 274 are illustrated here as being radially secured in place by grout or cement 293. In an alternative arrangement (not shown) both heat-transfer media conduits 272 and 274 are each suspended in well casings, the well casings being rigidly secured in place by grout or the like. This alternative arrangement allows heat-transfer media conduits 272 and 274 to be removed conveniently from the respective well casings for cleaning or repair. Referring again to FIG. 9, heat transfer media conduit 274 extends downwardly adjacent well casing 282 and is connected by horizontal section 296 which is shown here simply as a transverse section of insulated tubular. Horizontal section 296 links heat-transfer media channel 298, defined by heat-transfer conduit 274, in flow communication with partitioned heat transfer media chamber 276 at subchamber or circulation space 300. Circulation space 300 should be of sufficient size to allow good circulation of the heat-exchange medium below reaction vessel 280. By connecting heat-transfer conduit 274 to partitioned heat-transfer media chamber 276 at the lower end of reaction vessel 286, hot heat-transfer medium is quickly brought into partitioned heat-transfer media chamber 276 for immediate contact and thus immediate heat transfer to reaction vessel 280.

In order to continuously circulate heat exchange medium through partitioned heat-transfer media chamber 276, which is preferably introduced through heat-transfer media channel 298, heat-transfer conduit 272 is arranged such that the heat-transfer media channel 302 which it defines is connected to circulation space 300 by horizontal section 304, which is again a transverse section of insulated tubular. It is preferred that this connection between horizontal section 304 and circulation space 300 be made near the top of circulation space 300. This allows for the withdrawal of hot heat-transfer medium through heat-transfer media channel 302 during the exothermic phase of a reaction. Significant heat conservation if thus achieved and the hot heat-transfer medium may be used as a source of thermal energy in surface applications.

Figure 10:
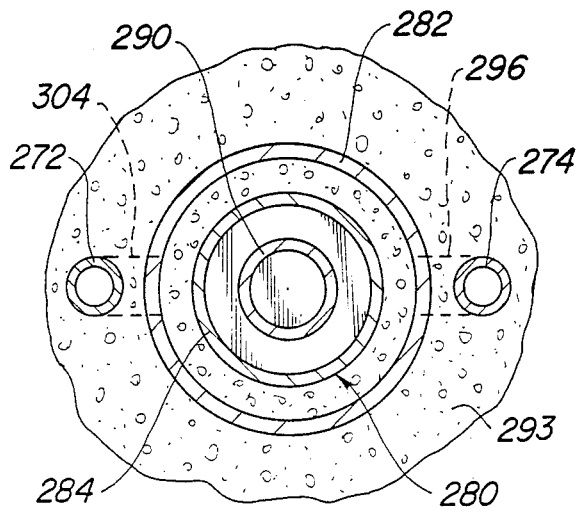
FIG. 10 is a cross-sectional view taken along lines 10—10 of FIG. 9.

The concentricity of reaction vessel 280 in reaction apparatus 271 of FIG. 9 is shown clearly in FIG. 10 of the drawings which is a cross-sectional view taken along line 10—10 of FIG. 9. There, heat-transfer media conduits 272 and 274 are shown secured in place by grout 293, with horizontal sections 296 and 304 shown in phantom. Well casing 282 is also seen secured in place, having reaction vessel 280 suspended therein.

Figure 12:
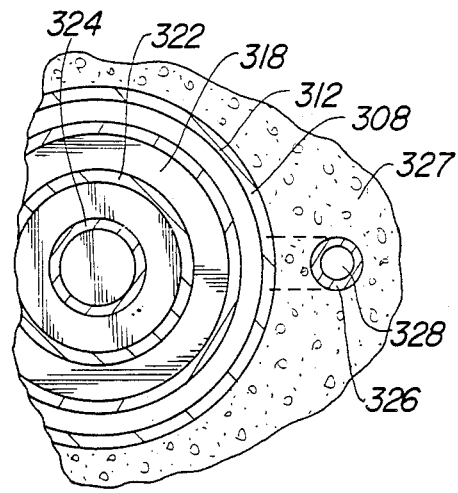
FIG. 12 is a cross-sectional view taken along lines 12—12 of FIG. 11.
Figure 11:
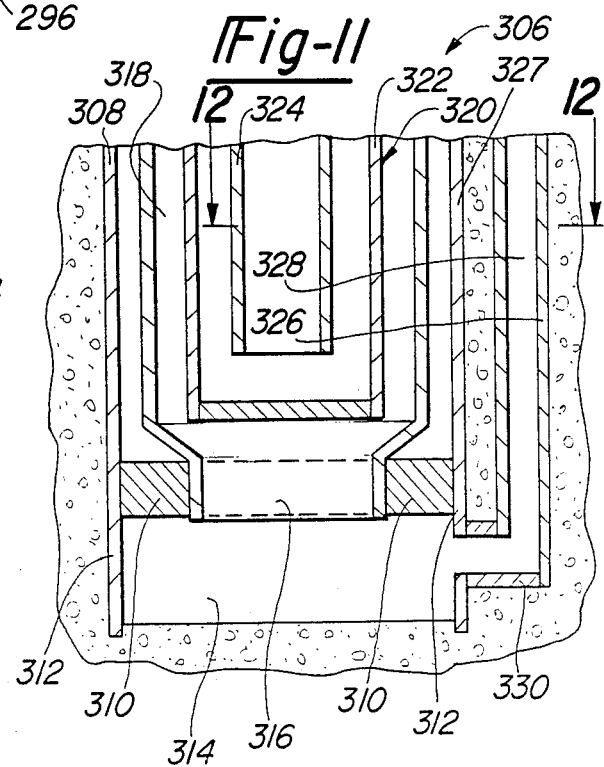
FIG. 11 is a vertical cross-section of the subsurface portion of another arrangement of the present invention.

In FIG. 11, a modification of the reaction apparatus shown in FIG. 8, is depicted generally as reaction apparatus 306 which includes heat-exchange jacket 308 having pack-off assemblies 310 which make sealing contact with well casing 312. Subchamber 314 is thereby defined such that heat-transfer medium entering subchamber 314 is forced upwardly through open end 316 of heat-exchange jacket 308. Heat-exchange jacket 308 defines heat-exchange annulus 318 through which heat-exchange medium is in heat-transfer relation with reaction vessel 320 at waste containment pipe 322. Centrally disposed in waste containment tube 322, in the manner previously described, resides waste tube 324. In this embodiment, and referring now to FIGS. 11 and 12, heat-transfer conduit 326 is seen secured in place by grout 327 and defines heat-transfer media channel 328 which is in flow communication with subchamber 314 by virtue of horizontal section 330. Heat-transfer media conduit 326 and horizontal section 330 preferably comprise sections of insulated tubular.

Figure 13:
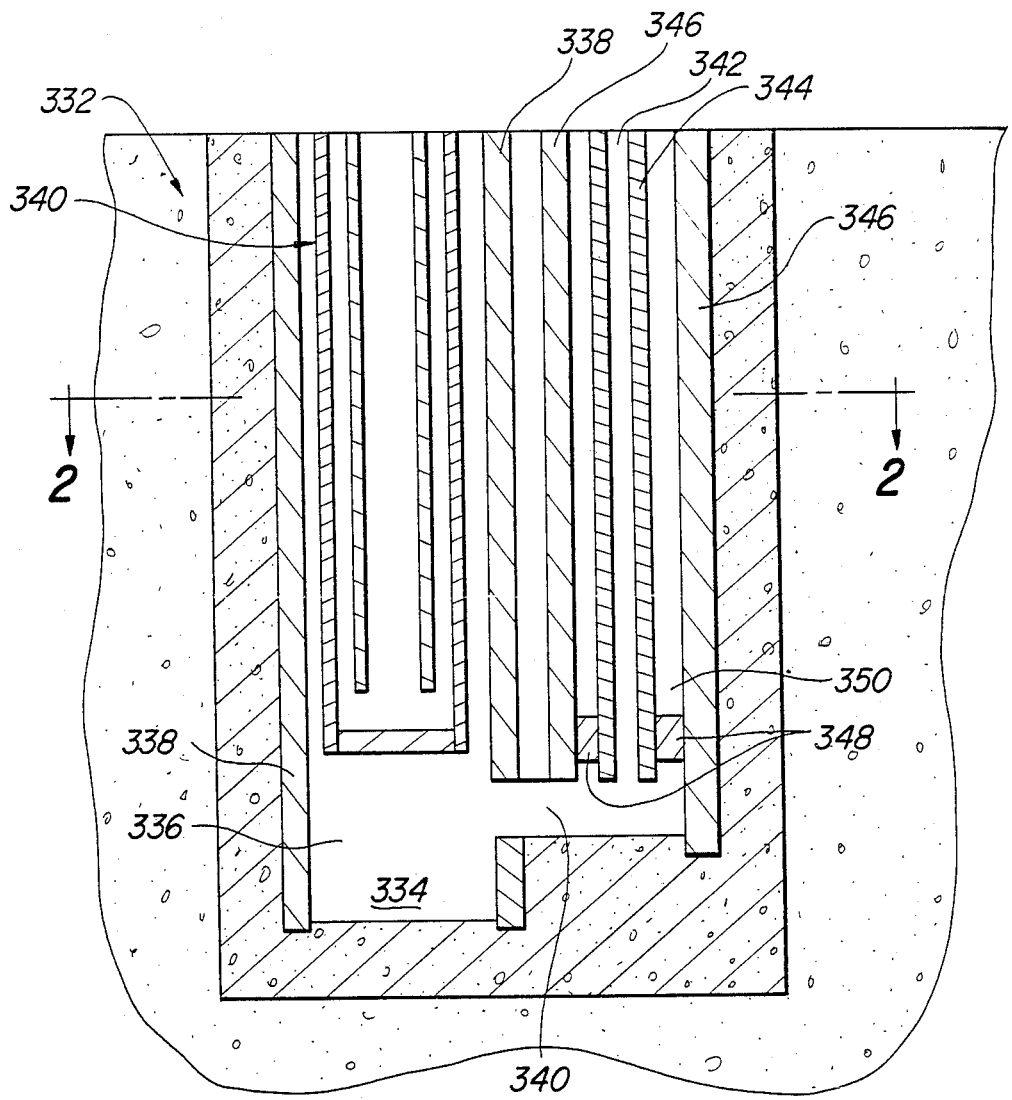
FIG. 13 is a vertical cross-sectional view of the subsurface portion of a modification of the present invention.
Figure 14:
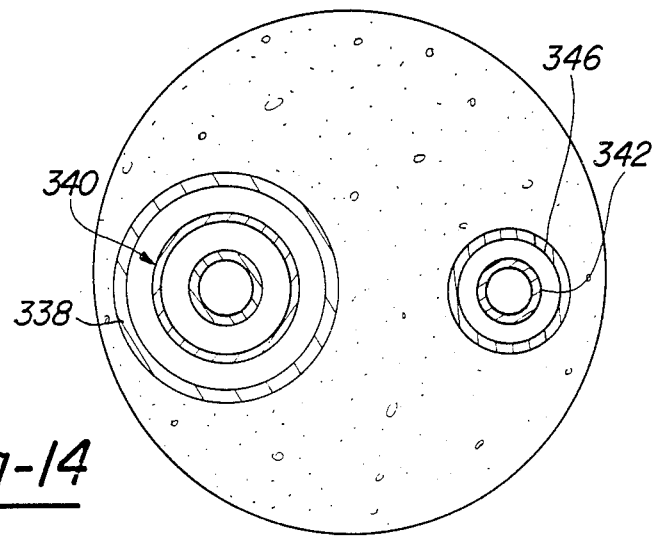
FIG. 14 is a cross-sectional view along lines 14—14 of FIG. 13.

Referring now to FIG. 13 of the drawings, reaction vessel 322 is shown generally having subchamber 334 which is the lower portion of heat-transfer media chamber 336. Heat-transfer media chamber is again defined by well casing 338 shown grouted in place in a well hole. Reaction vessel 340 is suspended therein in the fashion previously described which allows for its convenient removal from heat-transfer media chamber 336. In this embodiment of the present invention and referring now also to FIG. 14 of the drawings, a portion of well casing 338 is interrupted at horizontal passage 340 which serves to provide flow communication between heat-transfer media channel 342 and heat-transfer media chamber 336. To allow heat-transfer conduit 344 to be conveniently removed from reaction apparatus 332 a separate well casing 346 is provided which is rigidly secured in place by grout 327 as shown in both FIGS. 13 and 14. The flow of heat-transfer medium through channel 344, across passage 340 and into heat-transfer media chamber 336 is maintained by providing packing assemblies 348 which prevent the heat-transfer medium from flowing into annulus 350. By providing subchamber 334 good circulation of the heat-transfer medium through the system is obtained.

It is to be understood that the foregoing detailed description is given merely by way of illustration and that many variations may be made therein without departing from the spirit of this invention.

What is claimed is:

1. A reaction apparatus for effecting chemical reactions, comprising:

means for holding a heat exchange medium, said holding means including a well casing lining a vertical subterranean shaft, said well casing defining an elongated chamber, said chamber having an upper portion and a lower portion;

a thermally insulated elongated conduit disposed in said elongated chamber and extending into and open to said lower portion of said elongated chamber for conveying a heat exchange medium into said elongated chamber;

an elongated reaction vessel disposed in said elongated chamber and spaced from said thermally insulated elongated conduit, said reaction vessel having first and second pipe portions defining first and second communicating flow passages, said first and second flow passages being in heat exchange relation to one another;

means for introducing a fluid containing at least two reactants into said elongated reaction vessel to form a fluid column having a reaction zone at a selected pressure; and means for cycling said heat exchange medium through said thermally insulated elongated conduit and said elongated chamber such that said heat exchange medium is in heat exchange relation with said elongated reaction vessel so that heat can be transferred between said heat exchange medium and said reactants in said elongated reaction vessel to bring about and to control a chemical reaction between said reactants.

2. The reaction apparatus recited in claim 1, further including a second elongated reaction vessel disposed in said elongated chamber and spaced from said thermally insulated elongated conduit, said second elongated reaction vessel having first and second pipe portions defining first and second communicating flow passages, said first and second flow passages being in heat exchange relation to one another and said second elongated reaction vessel being spaced from said first elongated reaction vessel.

3. The reaction apparatus recited in claim 1, wherein said first pipe portion of said reaction vessel is substantially concentrically disposed in said second pipe portion of said reaction vessel, said first pipe portion being spaced from said second pipe portion and wherein one of said first and second communicating flow passages is an annulus defined by said first and second pipe portions with said second pipe portion being closed at its lower end.

4. The reaction apparatus recited in claim 1, wherein said elongated reaction vessel further includes a third pipe portion surrounding said first and second pipe portions, said third pipe portion defining a passage in heat transfer relation to one of said first and second communicating flow passages, said passage defined by said third tube portion being in flow communication with said elongated chamber and wherein said means for cycling said heat exchange medium through said thermally insulated elongated conduit in said elongated chamber also cycles said heat exchange medium through said passage defined by said third pipe portion.

5. The reaction apparatus recited in claim 4, further including at least one packing assembly disposed in said elongated chamber, said packing assembly being in sealing contact with said well casing, said third pipe portion, and said thermally insulated elongated conduit, said packing assembly forming a partition between said upper portion and said lower portion.

6. The reaction apparatus recited in claim 1, including a plurality of said elongated reaction vessels.

7. A reaction apparatus for producing chemical reactions in a liquid to form at least one reaction product, said reaction apparatus comprising:
   means for holding a heat exchange medium, said means including a well casing lining a subterranean shaft and defining an elongated chamber for receiving a heat exchange medium, said chamber having an upper portion and a lower portion;
   a reservoir at substantially ground surface level for holding said heat exchange medium;
   a thermally insulated tube vertically suspended in said chamber and extending into and open to, said lower portion of said chamber, said thermally insulated tube being spaced apart from said well casing and being connected at one end to said reservoir;
   a pipe having its lower end closed, said pipe being being vertically disposed in said elongated chamber and being externalized relative to said thermally insulated tube;
   a conduit extending into the bore of said closed end pipe in concentric arrangement with said closed end pipe, said pipe and said conduit defining communicating first and second flow passages;
   means for introducing said liquid and reactants into said first flow passage to form a fluid column of reactants having a selected pressure at a reaction zone in said first flow passage;
   means for supplying heat to said heat exchange medium;
   means for pumping said heat exchange medium from said reservoir through said thermally insulated tube and into said chamber such that said heat exchange medium is in heat exchange relation to said first flow passage and to said fluid column of reactants to raise the temperature of said reactants in said reaction zone to a selected temperature at which a chemical reaction between said reactants is brought about to produce a reaction product;
   means for flowing said reaction product from said first flow passage to said second flow passage and out of said subterranean shaft;
   means at substantially ground surface level for removing heat from said heat exchange medium.

8. The reaction apparatus recited in claim 7, further including a layer of grout between said well casing and the walls of said subterranean shaft.

9. The reaction apparatus recited in claim 7, further including a base plate at substantially ground level and wherein said thermally insulating tube, said pipe and said conduit are connected at one end to said base plate.

10. The reaction apparatus recited in claim 7, wherein said first flow passage is an annulus defined by said pipe and said conduit, and wherein said second flow passage is the bore of said conduit.

11. A reaction apparatus for carrying out chemical reactions between at least two reactants in a fluid and for supplying or removing heat from said reactants, said reaction apparatus comprising:
   means for holding a heat exchange medium, said holding means including a well casing lining a vertical subterranean shaft, said well casing defining an elongated chamber for receiving a heat exchange medium, said chamber having an upper portion and a lower portion;
   a thermally insulated conduit which extends from substantially ground surface level into the lower portion of said chamber and is open to said lower portion of said elongated chamber said thermally insulated conduit being spaced apart from said well casing and defining a first flow passage in flow communication with said chamber
   an elongated reaction vessel which extends from substantially ground level into said chamber, said reaction vessel being substantially parallel and externalized relative to said thermally insulated conduit, said reaction vessel having an outer tube enclosing an intermediate tube, said outer tube being open at its lower end, said intermediate tube being closed at its lower end and concentrically spaced apart from said outer tube to define a heat exchange annulus, said reaction vessel further having an inner tube, said inner tube being concentrically disposed in and spaced apart from said intermediate tube to define a reactant annulus;
   means for introducing said reactants into said reactant annulus to form a fluid column having a selected fluid pressure at a reaction zone in said reactant annulus;
   means for flowing a heat exchange medium through said thermally insulated conduit, into said chamber and into said heat exchange annulus in heattransfer relation to said reactant annulus;
   means for controlling the temperature of said heat exchange medium to control the temperature of said reactants to bring about a chemical reaction of said reactants in said reactant annulus to form reaction products;
   means for flowing said reaction products through said bore of said inner tube and out of said subterranean shaft.

12. The reaction apparatus recited in claim 11, further including at least one packing assembly in sealing contact with said outer tube and said well casing and in sealing contact with said thermally insulated conduit and said well casing such that said packing assembly partitions said upper portion from said lower portion and such that heat exchange medium flowed through said conduit into said chamber is confined to said lower portion of said chamber and to said heat exchange annulus.

13. The reaction apparatus recited in claim 11, further including a support plate at substantially ground surface level and wherein said reaction vessel is suspended in said subterranean shaft in a depending manner from said support plate.

14. The reaction apparatus recited in claim 11 further including a second thermally insulated conduit which extends from substantially ground surface level into the lower portion of said chamber whereby said heat exchange medium is cycled through said first conduit into said lower portion of said chamber and said heat exchange medium is withdrawn from said lower portion of said chamber through said second conduit.

15. A reaction apparatus for affecting chemical reactions, comprising:

means for holding a heat exchange medium, said means including a first well casing disposed in a subterranean shaft and defining a chamber, said chamber having an upper portion and a lower portion;

a reaction vessel vertically disposed in said chamber, said reaction vessel having first and second pipe portions defining first and second communicating flow passages, said first and second flow passages being in heat exchange relation to one another;

a second well casing disposed in said subterranean shaft substantially parallel to and spaced from said first well casing, said second casing defining a passage and said second well casing having a horizontal portion at its lower end in flow communication with said lower portion of said chamber;

a thermally insulated conduit disposed in said passage, said thermally insulated conduit having a horizontal portion in flow communication with and opening into said lower portion of said chamber;

means for introducing a fluid containing at least two reactants into said reaction vessel to form a fluid column having a selected pressure at a reaction zone in the lower portion of said fluid column; and means for cycling said heat exchange medium through said thermally insulated conduit and said chamber such that said heat exchange medium is in heat exchange relation with said reaction vessel so that heat can be transferred between said heat exchange medium and said reactants in said reaction vessel to bring about and to control a chemical reaction between said reactants and whereby said reaction vessel and said thermally insulated conduit can be removed respectively from said first well casing and said second well casing to allow said reaction vessel and said thermally insulated conduit to be repaired and cleaned.

* * * * *